Patented Jan. 28, 1941

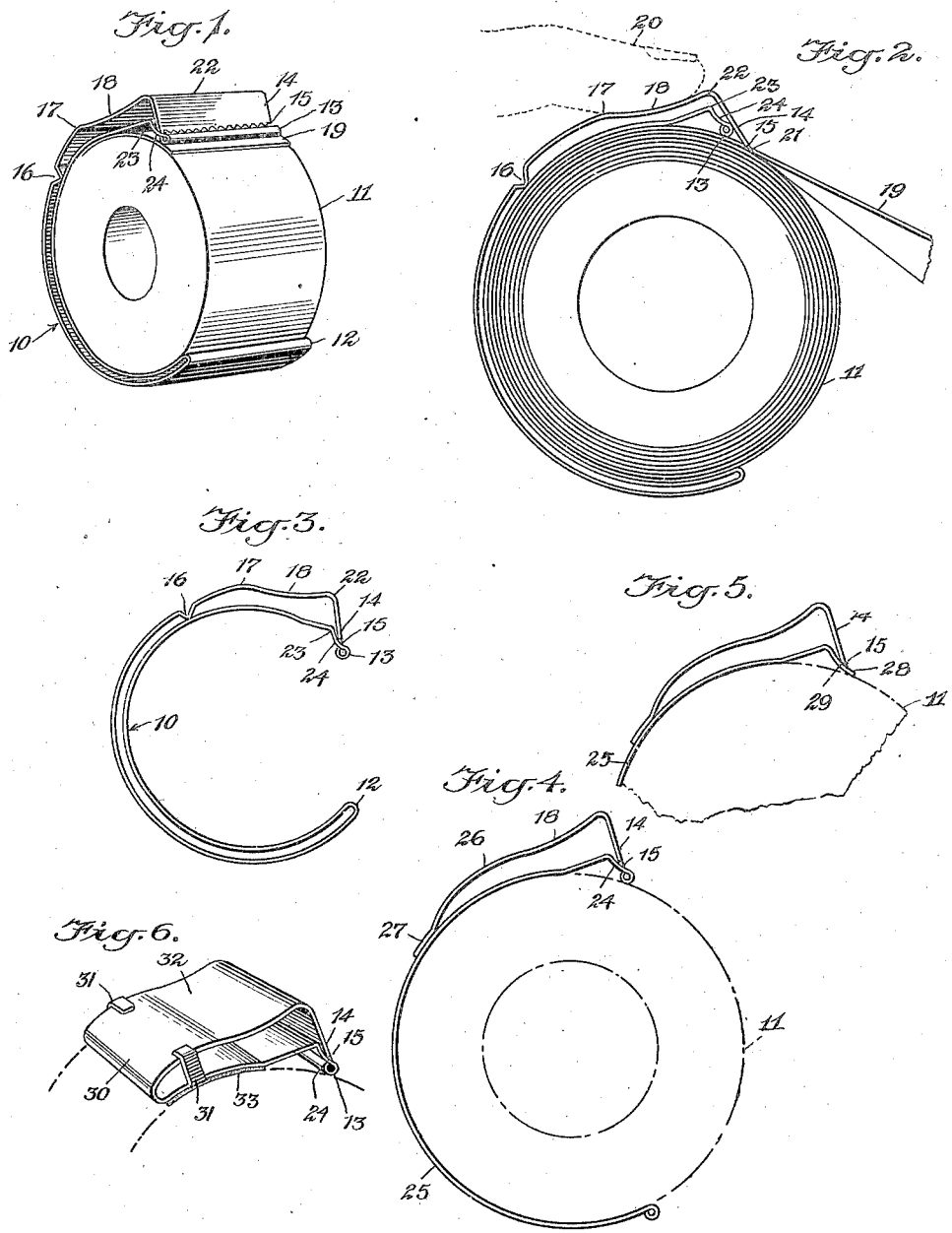

2,229,961

UNITED STATES PATENT OFFICE 2,229,961

SHIELDED CUTTING DEVICE

Gerard C. Deane, New York, N. Y.

Application October 4, 1938, Serial No. 233,231

9 Claims. (Cl. 206—59)

This invention relates to cutters, and more particularly to cutters of the type which may be used on material sold in rolls, such as cloth, ribbon, paper, textiles, and more particularly adhesive plaster.

An object of the invention is to provide a cutter which may be adapted to a roll of the material indicated and removed from the roll when the roll is exhausted.

Another object is to provide a cutter of the type indicated which will more efficiently operate on the material to be cut, which will be economical to manufacture, and which may be easily and simply operated.

In the past various cutters adapted for use on the materials indicated, and particularly on adhesive tape, have been constructed. These cutters have been objectionable inasmuch as the cutting edge was not protected, with the result that the use of the cutter was awkward and the cutting edge often interfered with the withdrawal of the tape.

My invention provides a cutter which, when not in use, will not interfere with the withdrawal of the tape, and which is provided with a shield to prevent accidental tearing or scoring of the tape.

A further object of my invention is to provide a cutter which will be self-sharpening and which will therefore maintain a keen edge.

Another object is to provide a cutter which while economical in construction will have a long life and which will adjust itself to various sizes of rolls.

With these and other objects in view, which will appear as the description proceeds, reference is had to the accompanying drawing, in which—

Fig. 1 is a perspective view of the roll of material, such as adhesive tape, with my cutter applied;

Fig. 2 is a cross-sectional view of the cutter shown in Fig. 1;

Fig. 3 is a cross-sectional view of the cutter off the roll;

Figs. 4 and 5 are modified forms of my cutter, and illustrate a form which may be preferable to that shown in Figs. 1 and 2;

Fig. 6 is another modification of my cutter.

As shown in Figs. 1 and 2, the cutter 10 is adapted to be applied to a roll of material, such as adhesive tape 11.

In the form shown in Figs. 1, 2 and 3, the cutter 10 is a continuous piece of spring steel doubled upon itself at 12 and having a curled knob 13 at one end and a sharpened edge 14 at the other end. The edge 14 may be provided with teeth 15 at the outer edges or, if desired, all the way across. In its normal position the edge 14 rests upon the curled edge 13.

The outer surface of the cutter is crimped at 16 to form a rocking point for the operating bar of the cutter 17. The operating portion of the cutter 17 may be depressed slightly at 18 to form a convenient thumb hold.

The cutter 10 is preferably made of spring steel so that it may be stretched to cover a large roll and will contract to maintain contact as the roll diminishes in size.

As shown in Figs. 1 and 2, the cutter is placed about the roll and the tape 19 may be drawn off the roll with the roll rotating inside the cutter. When it is desired to cut a piece, the finger or thumb 20 exerts pressure at 18 thus causing the cutting edge 14 to slide over the curled portion 13 and to come into contact with the tape 19 at 21. Upward or sideward pressure on the tape 19 will then cause it to be cut at 21.

The operating member 17 has an angular portion 22 which controls the angle of the cutting edge 14. Above the curled end 13 is another angle 23 to provide a surface 24 immediately above the curled edge 13 to form a proper contact with the bottom of the cutting edge 14.

As will be seen from the drawing, and more particularly Fig. 2, the angle 22 allows leeway to permit the cutting edge 14 to be pressed over the curled edge 13 and into contact with the tape at 21.

In the form shown in Figs. 5 and 6, a single piece of spring steel 25 is provided with the cutting portion 26 spot-welded or riveted thereto at 27. The use of a single piece of spring steel 25 allows a greater latitude and the use of the cutter on different sizes of rolls.

As shown in Fig. 5, the curled edge 13 may be eliminated and the extremity 28 of the member 25 may be plain. This form reduces the cost of manufacture and still gives a sharpening surface 29 to sharpen the cutting edge 14 when the cutter is used.

In the modified form shown in Fig. 6, a pocket cutter is provided which is adapted to be placed on the roll of material only when the cutting operation is to be performed. This consists of a continuous piece of spring steel 30 held in the doubled position by the flanges 31 which are bent over the top 32 to keep the cutter in position. A piece of rough or abrasive material 33 may be placed on the bottom of the cutter to prevent it from sliding when in use. Otherwise the cutter operates in the same manner as that shown in the other figures, with the cutting edge 14 being sharpened by friction against the curled edge 13 and the surface 24.

I claim:

1. A cutter for use with rolled material, comprising a body or resilient material adapted to partially encircle said roll, said body being bent inwardly adjacent one of its ends, a resilient cutting element fastened to said body having an angular portion adjacent the end thereof, a cutting edge on the end of said angular portion adapted to normally engage said bent portion on said body portion and to slide over said bent portion when pressure is placed on said cutting element.

2. A cutter for use with rolled material, comprising a piece of spring steel bent upon itself, one end of said spring steel having an angle and a curled edge, the other end of said spring steel being crimped adjacent its edge and bent inwardly, teeth on said inwardly bent end adapted to rest normally between said curled portion and said angle, and adapted to slide over said curled portion into operative position under pressure.

3. A cutter of the class describe for use on rolled material, comprising a member adapted to engage said roll, a cutting member resiliently positioned above said roll-engaging member and adapted to normally rest thereon, said cutting member being adapted to be moved over said roll-engaging member into active contact with said roll under pressure, whereby the frictional action of said cutting member over said roll-engaging member tends to sharpen said cutting edge.

4. A cutter for use on rolled material, comprising a piece of resilient material bent upon itself, means on one portion of said material to hold said material in bent position, one end of said bent material being curled on itself and the other end constituting a cutting edge normally adapted to rest on said curled end and adapted to move over said curled end under pressure.

5. A cutter for use on rolled material, comprising a piece of resilient material bent upon itself, means on one portion of said material to hold said material in bent position, one end of said bent material being curled on itself and the other end constituting a cutting edge normally adapted to rest on said curled end and adapted to move over said curled end in frictional engagement therewith under pressure.

6. A cutter for use on rolled material, comprising a piece of resilient material bent upon itself, means on one portion of said material to hold said material in bent position, and abrasive material on the bottom of said portion, one end of said bent material being curled on itself and the other end constituting a cutting edge normally adapted to rest on said curled end and adapted to move over said curled end under pressure.

7. A cutter of the type described for use on rolled material, comprising a roll-engaging member having an angular end, a cutting element resiliently disposed above said roll-engaging member and normally adapted to rest on said angular end, said cutting element being adapted to move over said angular end in frictional engagement therewith into operative position.

8. A cutter of the type described for use on rolled material, comprising a roll-engaging member having a curled end, a cutting element resiliently disposed above said roll-engaging member and normally adapted to rest on said curled end, said cutting element being adapted to move over said curled end and in frictional engagement therewith into operative position.

9. A package including a reel, a roll of material on said reel and a cutter disposed on said roll, said cutter comprising a roll-engaging member, a cutting member resiliently positioned against said roll-engaging member and adapted to normally rest thereon, said cutting member being adapted to be moved over said roll-engaging member into active contact with said material under pressure to cut said material.

GERARD C. DEANE.